(12) United States Patent
Dong et al.

(10) Patent No.: US 6,705,567 B2
(45) Date of Patent: Mar. 16, 2004

(54) TANDEM WING AIRCRAFT AND METHOD FOR MANUFACTURING AND OPERATING SUCH AIRCRAFT

(75) Inventors: Lawrence Y. Dong, Bellevue, WA (US); Mithra M. K. V. Sankrithi, Shoreline, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/140,200

(22) Filed: May 6, 2002

(65) Prior Publication Data

US 2004/0007647 A1 Jan. 15, 2004

(51) Int. Cl.[7] .................................................. B64C 1/00
(52) U.S. Cl. .................. 244/13; 244/45 A; 244/117 R; 244/118.5; 244/119
(58) Field of Search ........................... 244/12.1, 13, 15, 244/45 A, 117 R, 118.5, 118.6, 119, 118.1, 45 R

(56) References Cited

U.S. PATENT DOCUMENTS

| | | | |
|---|---|---|---|
| 3,900,178 A | | 8/1975 | Tupolev et al. ................ 244/55 |
| 4,598,888 A | * | 7/1986 | Beteille ...................... 244/76 R |
| 4,767,083 A | | 8/1988 | Koenig et al. ............. 244/12.3 |
| 5,115,999 A | * | 5/1992 | Buchsel et al. .......... 244/118.5 |
| 5,299,760 A | | 4/1994 | Finch et al. .............. 244/53 B |
| 5,529,263 A | | 6/1996 | Rudolph ...................... 244/55 |
| RE35,387 E | | 12/1996 | Strom ...................... 244/75 R |
| D399,816 S | | 10/1998 | Peacock |
| 5,842,666 A | | 12/1998 | Gerhardt et al. .......... 244/75 R |
| 5,897,078 A | | 4/1999 | Burnham et al. ....... 244/177 R |
| 5,899,409 A | * | 5/1999 | Frediani ...................... 244/13 |
| D417,184 S | | 11/1999 | Hartmann et al. |
| 6,070,831 A | * | 6/2000 | Vassiliev et al. ............. 244/120 |
| 6,138,954 A | * | 10/2000 | Gaunt ......................... 244/198 |
| D437,284 S | | 2/2001 | Knutson et al. |
| D439,876 S | | 4/2001 | Simonov et al. |
| 6,422,518 B1 | * | 7/2002 | Stuff et al. ................... 244/199 |
| 6,575,406 B2 | * | 6/2003 | Nelson ........................ 244/119 |

OTHER PUBLICATIONS

U.S. patent application Ser. No. 09/822,962, Balzer, filed Mar. 30, 2001.
U.S. patent application Ser. No. 09/816,985, Seidel, filed Mar. 23, 2001.
U.S. patent application Ser. No. 09/671,870, Clark, filed Sep. 27, 2000.
"Prototypes: Comparative Design Analysis," Aviation Week & Space Technology, Sep. 17, 1990 (p. 45).
Scott, William, B., "YF–23A Previews Design Features of Future Fighters," Aviation Week & Space Technology, Jul. 2, 1990 (pp. 16–21).

(List continued on next page.)

Primary Examiner—J. Woodrow Eldred
(74) Attorney, Agent, or Firm—Perkins Coie LLP

(57) ABSTRACT

An aircraft and associated method of manufacture and operation. The aircraft can include a fuselage having a first portion and a second portion projecting upwardly from the first portion, with the first portion housing a passenger deck and the second portion being positioned above the passenger deck. A first wing can extend outwardly from the first portion of the fuselage and the second wing can extend outwardly from the second portion of the fuselage, with the second wing being positioned above and forward of the first wing. Accordingly, the fuselage can include a plurality of passenger doors simultaneously accessible to ground-based passenger load/unload equipment with at least one of the passenger doors positioned beneath the second wing.

94 Claims, 7 Drawing Sheets

OTHER PUBLICATIONS

"Photos Show Key Features of YF–23A ATF," Aviation Week & Space Technology, Jul. 9, 1990 (pp. 54–55).

Dryden Flight Research Center, Feb. 1998 (6 pages).

Rockwell/MBB X31A (p. 184)**.

U.S. patent application Ser. No. 09/969,801, Sankrithi, filed Oct. 2, 2001.

Taylor, Michael J.H., "Jane's Pocket Book of Research and Experimental Aircraft," North American XB–70A Valkyrie, Collier Books, New York 1976 (3 pages).

Liebeck, R.H. et al., AIAA 98–0438, Blended–Wing–Body Subsonic Commercial Transport, 36th Aerospace Sciences Meeting & Exhibit, Jan. 12–15, 1998, Reno, Nevada (pp. 1 and 4).

Capone, Franics J. and Reubush, David E., "Effects of Varying Podded Nacelle–Nozzle Installations on Transonic Aeropropulsive Characteristics of a Supersonic Fighter Aircraft," NASA Technical Paper 2120, 1983 (pp. 83 and 99).

Brennan, Heather, "Spotlight on . . . Daniel Raymer," AIAA Editorial Echoes Interview with Daniel Raymer, Spring 2000 (3 pages). http://www.aircraftdesign.com/spotlight-on.html [Accessed Oct. 29, 2001].

"Dan Raymer" (1 page) http://www.aircraftdesign.com/raymer.html [Accessed Oct. 29, 2001].

Aircraft Conceptual Design Drawings & Pictures (3 pages) http://www.aircraftdesign.com/acpix.html [Accessed Oct. 30, 2001].

"Rockwell/MBB X–31 Makes Second Flight, Reaching 20,000–Ft. Altitude, Mach 0.6," Aviation Week & Space Techn., p. 117, Oct. 22, 1990.

Stinton, Darrol, "The Anatomy of the Aeroplane," Granada Publishing Limited, 1966, (pp. 27, 276, 274, 162).

Angelucci, Enzo, "World Encyclopedia of Civil Aircraft, from Leonardo da Vinci to the Present," Crown Publishers, Inc., New York, 1981 (p. 364).

Roskam, Jan, Dr., "Airplane Design Part II: Preliminary Configuration Design and Integration of the Propulsion System," Roskam Aviation and Engineering Corporation, Ottawa, Kansas, 1985 (pp. 76–78,81).

Poisson–Quinton, Philippe, "Slender Wings for Civil and Military Aircrafts," Twentieth Israel Annual Conference on Aviation and Astronautics, Feb. 22–23, 1978 (Title Page, p. 57, Figure 5).

NASA Technical Memoranum, "Proceedings of NASA Conference on Supersonic Transport Feasibility Studies and Supporting Research," Sep. 17–10, 1963 (Figure 45 only).

NASA Contractor Report 165934, "Large Payload Capacity SST Concepts—Technical and Economic Feasibility," Contract NAS1–16150, Jul. 1982.

International Search Report for International Application No. PCT/US01/02368, Aug. 28, 2001.

747 Product Photo Gallery, Copyright 2002, The Boeing Company (1 page) http://www.boeing.com/companyoffices/gallery/images/commercial/747400–01.html [Accessed Mar. 7, 2002].

FlyTriStar, Lockheed L–1011 TriStar Information Center (1 page) Last updated Feb. 8, 2002 http://flytristar.tripod.com/ [Accessed Mar. 7, 2002].

**The dates are unavailable, but the publications are earlier than effective U.S. filing date.

* cited by examiner

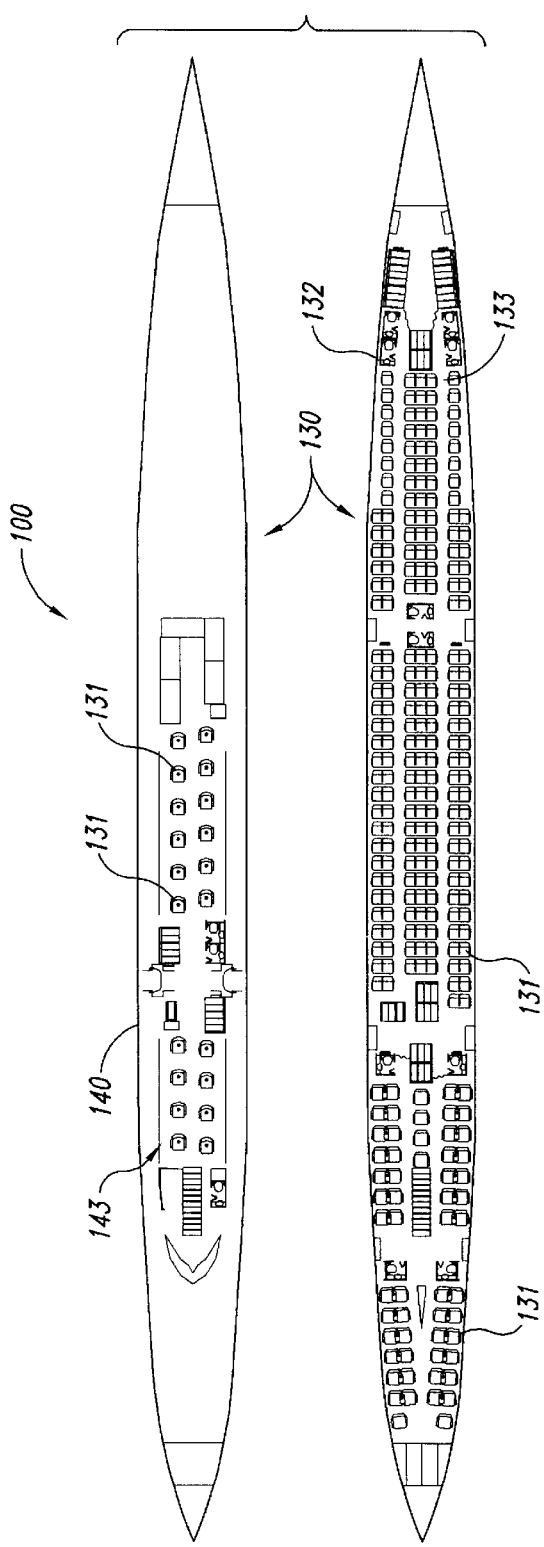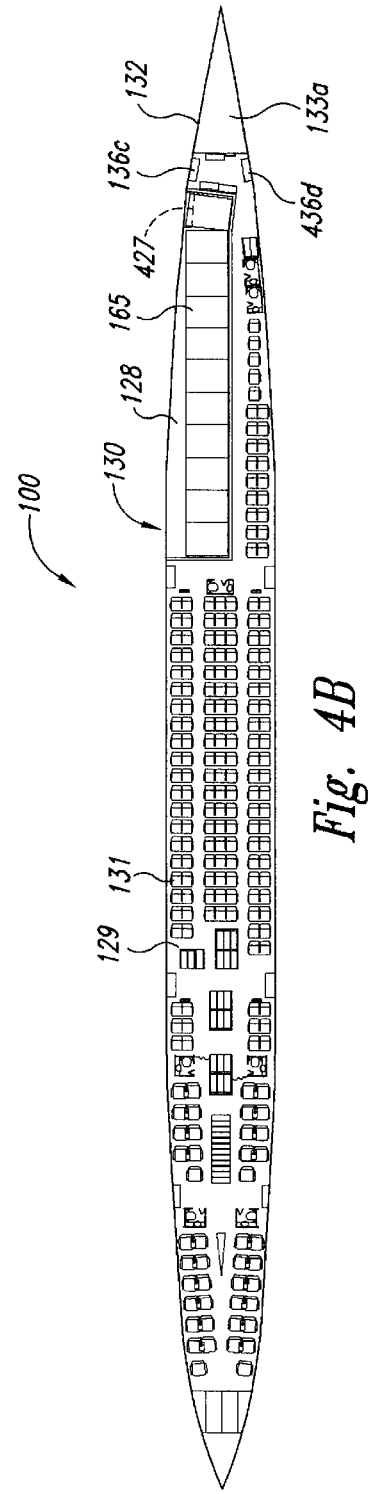
Fig. 4A
Fig. 4B

TANDEM WING AIRCRAFT AND METHOD FOR MANUFACTURING AND OPERATING SUCH AIRCRAFT

TECHNICAL FIELD

This present invention relates generally to tandem wing aircraft and methods for manufacturing and operating such aircraft.

BACKGROUND

One goal of the commercial air transport industry is to convey passengers and cargo as quickly as possible from one point to another. Accordingly, many commercial transport aircraft operate at cruise Mach numbers of approximately 0.8–0.85. As the time constraints placed on air carriers and their customers increase, it would be advantageous to economically transport passengers and cargo at higher speeds. However, aircraft flying at transonic or supersonic speeds (greater than about Mach 0.85) have greater relative thrust requirements than comparably sized subsonic aircraft. To generate sufficient thrust at high altitudes and Mach numbers, while reducing the corresponding increase in drag, conventional transonic and supersonic aircraft include low bypass ratio turbofan engines or straight turbojet engines. Such configurations generally have a high specific fuel consumption at cruise conditions that generally outweighs any inherent advantage in aerodynamic efficiency, resulting in a net fuel efficiency significantly lower than that of lower speed aircraft. The low fuel efficiency can also result in increased atmospheric emissions.

FIGS. 1A and 1B illustrate top isometric and bottom isometric views, respectively, of a supersonic cruise aircraft 10a in accordance with the prior art. The aircraft 10a can include a fuselage 13a, a delta wing 12a, a propulsion system 15a suspended from the wing 12a, and an aft-tailed pitch control arrangement 17. Alternatively, the aircraft 10a can include a tail-less or canard pitch arrangement. In either configuration, the longitudinal distribution of the exposed cross-sectional area of the aircraft, and the longitudinal distribution of the planform area tend to dominate the transonic and supersonic wave drag (i.e., the increase in drag experienced beyond about Mach 0.85 due to air compressibility effects). Accordingly, the fuselage 13a can be long, thin, and "area-ruled" to reduce the effects of wave drag at supersonic speeds.

Area-ruling the fuselage 13a can result in a fuselage mid-region that is narrower than the forward and aft portions of the fuselage (i.e., a "waisted" configuration). Waisting the fuselage can compensate for the increased cross-sectional area resulting from the presence of the wing 12a and the propulsion system 15a. The propulsion system 15a can include four engine nacelle pods 16a mounted beneath the wing 12a to minimize adverse aerodynamic interference drag and to separate the rotating machinery of the engines from the main wing spar and the fuel tanks located in the wing. Noise suppressor nozzles 18a are typically cantilevered well beyond a trailing edge of the wing 12a, and can accordingly result in large cantilever loads on the wing 12a.

FIGS. 1C–E illustrate a side view, plan view and fuselage cross-sectional view, respectively, of a configuration for a high-speed transonic cruise transport aircraft 10b having a fuselage 13b, a swept wing 12b, and engine nacelles 16b suspended from the wing 12b in accordance with the prior art. The fuselage 13b has a significantly narrowed or waisted portion proximate to a wing/body junction 19. Accordingly, the fuselage 13b is configured to avoid or at least reduce increased drag in a manner generally similar to that described above with reference to FIGS. 1A and 1B. This configuration may suffer from several drawbacks, including increased structural weight, increased risk of flutter loads, and a reduced payload capacity. The configurations shown in FIGS. 1A–1E can be structurally inefficient and can have reduced payload capacities as a result of the fuselage waisting required to reduce transonic and supersonic drag.

SUMMARY

The present invention is directed toward tandem wing aircraft and methods for manufacturing and operating such aircraft. An aircraft in accordance with one aspect of the invention includes a fuselage having a first portion and a second portion projecting upwardly from the first portion. The first portion houses a passenger deck and the second portion is positioned above the passenger deck. A first wing extends outwardly from the first portion of the fuselage and a second wing extends outwardly from the second portion of the fuselage. The second wing is positioned above and forward of the first wing.

In a further aspect of the invention, the fuselage can include a plurality of passenger doors simultaneously accessible to ground-based passenger load/unload equipment. At least one of the passenger doors is positioned beneath the second wing. In still further aspect of the invention, the aircraft can have a forward portion, an aft portion, and an intermediate portion between the forward and aft portions, with a cross-sectional area distribution of the aircraft increasing at least approximately monotonically from the forward portion to the intermediate portion, and decreasing at least approximately monotonically from the intermediate portion to the aft portion.

The invention is also directed toward a method for loading and unloading an aircraft and includes positioning a first passenger load/unload device adjacent to a first passenger door of the aircraft, with the aircraft having a first wing and a second wing positioned forward of and above the first wing. The method can further include positioning a second passenger load/unload device adjacent to a second passenger door of the aircraft while the second passenger load/unload device is positioned beneath the second wing of the aircraft and while the first passenger load/unload device is positioned adjacent to the first passenger door. The method can still further include simultaneously moving passengers through both the first and second passenger doors.

The invention is still further directed to a method for manufacturing an aircraft. The method can include providing a fuselage having a first portion and a second portion projecting upwardly from the first portion, with the first portion housing a passenger deck and the second portion being positioned above the passenger deck. The method can further include mounting a first wing to the first portion of the fuselage and mounting a second wing to the second portion of the fuselage with the second wing being positioned above and forward of the first wing. In a further aspect of the invention, the method can further include providing the fuselage with a plurality of passenger doors that are simultaneously accessible to ground-based passenger load/unload equipment, with at least one of the passenger doors being positioned beneath the second wing.

BRIEF DESCRIPTION OF THE DRAWINGS

FIGS. 4A and 4B illustrate top plan views of aircraft having deck configurations in accordance with embodiments of the invention.

DETAILED DESCRIPTION

The present disclosure describes high speed aircraft and methods for manufacturing and operating such aircraft. Many specific details of certain embodiments of the invention are set forth in the following description and in FIGS. 2A–7C to provide a thorough understanding of these embodiments. One skilled in the art, however, will understand that the present invention may have additional embodiments, and that the invention may be practiced without several of the details described below.

Figure 1A:
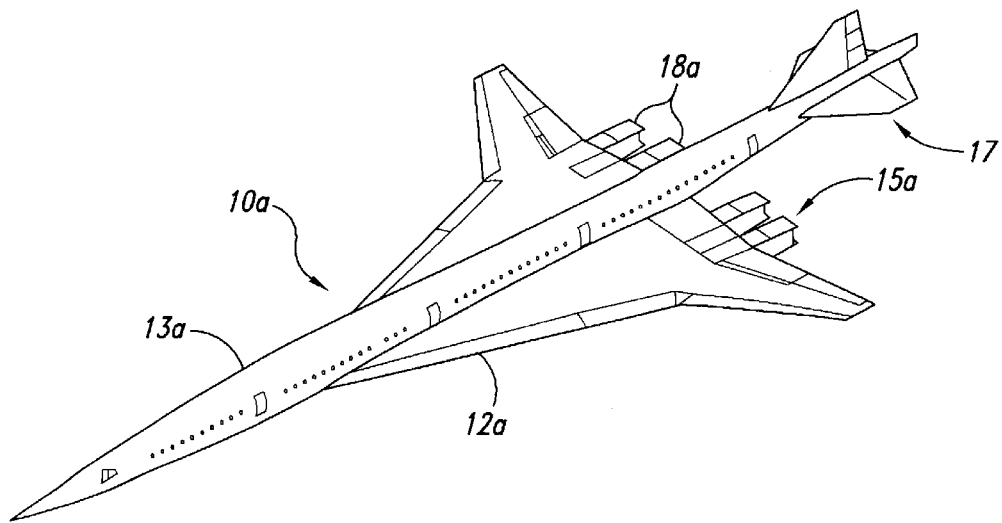
FIGS. 1A and 1B illustrate a supersonic transport aircraft configuration having a narrowed fuselage in accordance with the prior art.
Figure 1B:
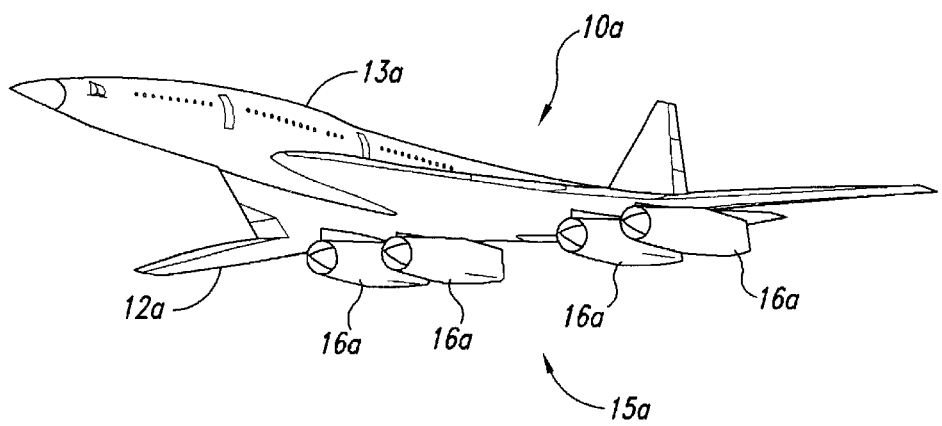
Figure 1C:
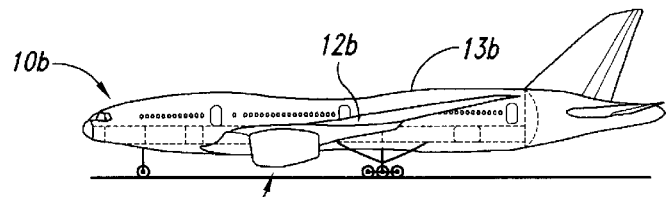
FIGS. 1C–1E illustrate a subsonic/transonic transport aircraft having a narrowed fuselage in accordance with the prior art.
Figure 1D:
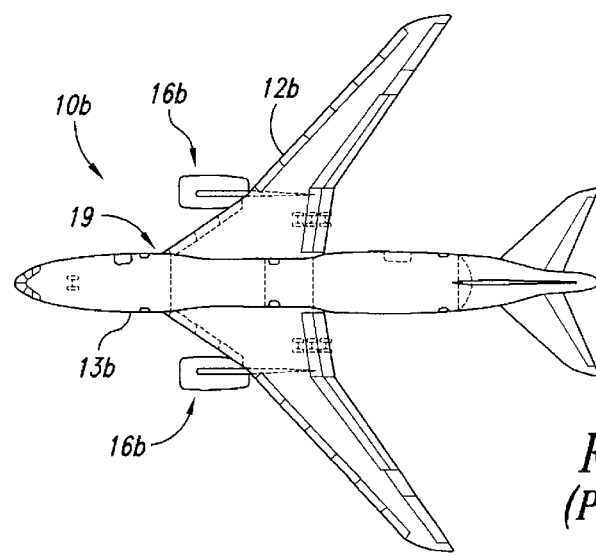
Figure 1E:
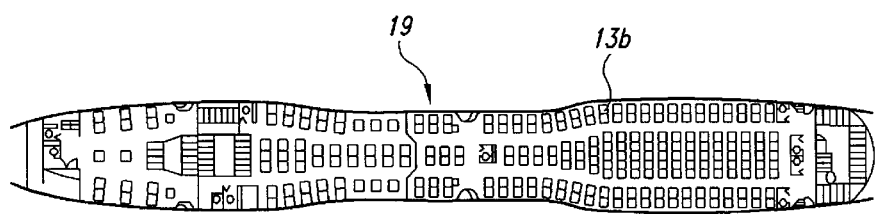
Figure 2A:
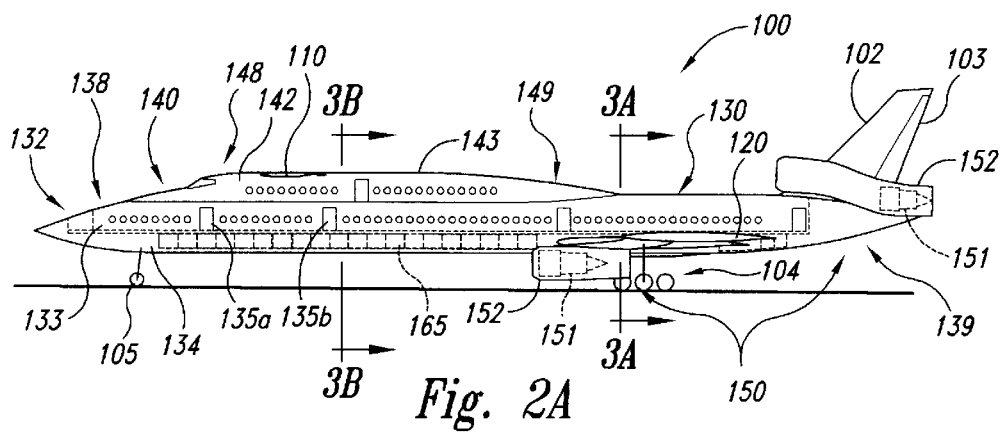
FIGS. 2A–2C illustrate an aircraft having a forward wing and an aft wing in accordance with an embodiment of the invention.

FIG. 2A is a side elevational view of an aircraft 100 having a fuselage 130, a swept aft wing 120, and a forward wing 110 that is swept and positioned above and forward of the aft wing 120. The aft wing 120 and the forward wing 110 can be integrated with the fuselage 130 in a manner that results in a generally monotonically increasing and monotonically decreasing cross-sectional area distribution, as described in greater detail below. As is also described in greater detail below, the elevated forward wing 110 can have a reduced aerodynamic impact on the aft wing 120, which can increase the stability and controllability of the aircraft 100. The elevated forward wing 110 can also allow greater access to the aircraft 100 during loading and unloading than is available for existing aircraft having canards.

In one embodiment, the fuselage 130 can have a lower portion 132 that extends aft for the entire length of the fuselage, and a projection 140 that extends upwardly from the lower portion 132 for at least a portion of the fuselage length. The aft wing 120 can extend outwardly from the lower portion 132, and the forward wing 110 can extend outwardly from the projection 140. Accordingly, the vertical separation between the forward wing 110 and the aft wing 120 can be increased compared to existing aircraft configurations that include a canard but lack the projection 140. In one aspect of this embodiment, the forward wing 110 can have a surface area that is a substantial fraction of the surface area of the aft wing 120. For example, the forward wing 110 can have a surface area that ranges from about 10% to about 50% of the surface area of the aft wing 120. In one particular embodiment (shown in FIGS. 2A–2C) the surface area of the forward wing 110 can be about 15% of the surface area of the aft wing 120. In other embodiments, the forward wing 110 can be smaller, for example, in an embodiment described below with reference to FIGS. 7A–7C.

The lower portion 132 of the fuselage 130 can include a forward region 138 which generally increases in cross-sectional area, and an aft region 139 which generally decreases in cross-sectional area. The projection 140 can be blended with the lower portion 132 of the fuselage 130 and can accordingly include a forward region 148 that increases in cross-sectional area, and an aft region 149 that decreases in cross-sectional area. The axial locations of the foregoing regions of the fuselage 130 can be selected to coincide with the axial locations of other components of the aircraft 100 to produce a generally smooth cross-sectional area distribution, as described in greater detail below with reference to FIG. 5.

In a further aspect of this embodiment, the lower portion 132 can house a first or lower passenger deck 133 and a cargo deck 134 positioned beneath the lower deck 133. The cargo deck 134 can accommodate containers 165 and/or loose baggage. The projection 140 can house a second or upper passenger deck 143 and a flight deck 142 positioned forward of the upper deck 143. The lower deck 133 and, optionally, the upper deck 143, can include passenger doors 135 (including a forward passenger door 135a and an aft passenger door 135b) to allow passengers and crew to enter and exit the aircraft 100.

In yet a further aspect of this embodiment, the aircraft 100 can be supported on a main landing gear 104 and a nose gear 105. The aircraft 100 can include a vertical stabilizer 102 with a rudder 103. In one embodiment, the aircraft 100 can include a propulsion system 150 having one nacelle 152 extending through the vertical stabilizer 102, and two nacelles 152 depending from the aft wing 120. Each nacelle 152 can house a single engine 151. In other embodiments, the propulsion system 150 can have other arrangements, such as those described in greater detail below with reference to FIGS. 6–7B.

Figure 2B:
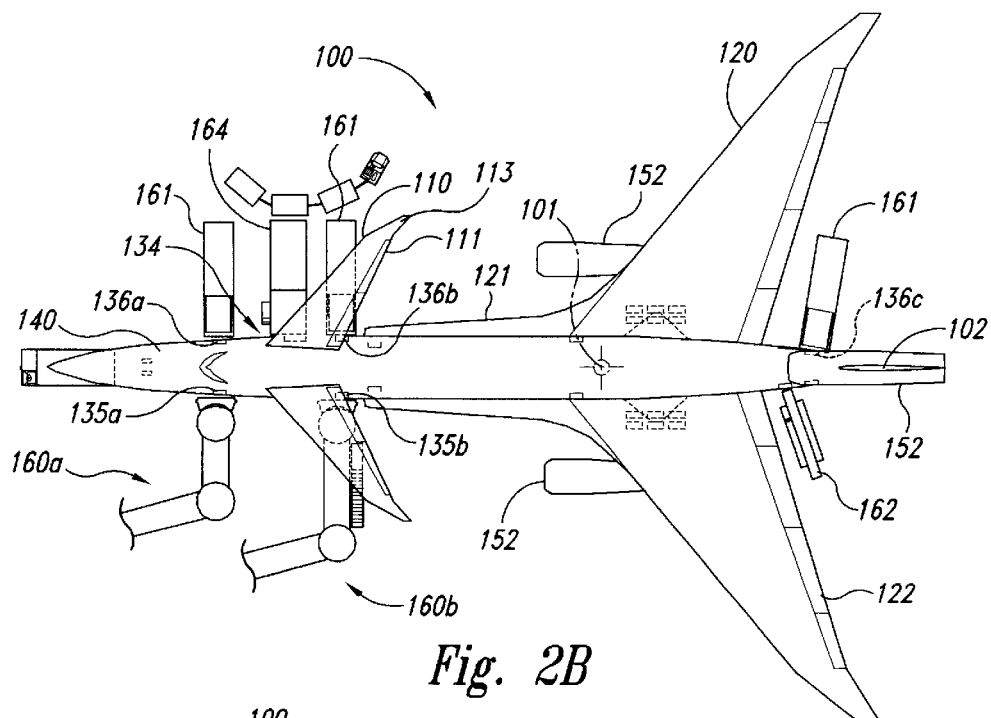

FIG. 2B is a top plan view of an embodiment of the aircraft 100 described above with reference to FIG. 2A. As shown in FIG. 2B, the aircraft 100 can include a strake 121 extending forward from the aft wing 120 toward the forward wing 110. The strake 121 can provide additional lift and stability for the aircraft 100, and can smooth the cross-sectional area distribution of the aircraft 100. The forward wing 110 of the aircraft 100 can include a wing box 113 and trim surfaces 111 positioned aft of the wing box 113 and moveable relative to the wing box 113. The aft wing 120 can include elevons 122 for pitch, trim, and roll control. The center of lift of the aft wing 120 can be positioned aft of the aircraft center of gravity 101, and the center of lift of the forward wing 110 can be positioned forward of the center of gravity 101. Accordingly, when the trim surfaces 111 are adjusted downwardly, they add to the lift generated by the aft wing 120 and the elevons 122 and increase the overall lift of the aircraft 100. This is unlike existing commercial passenger aircraft having trim surfaces that are positioned aft of the aircraft center of gravity and which typically reduce the overall lift of the aircraft when actuated.

The aircraft 100 is shown in FIG. 2B positioned near a terminal for loading and/or unloading in accordance with an embodiment of the invention. In one aspect of this embodiment, passengers can enter and/or exit the aircraft 100 through a first jetway 160a positioned next to the forward passenger door 135a and through a second jetway 160b positioned next to the aft passenger door 135b. In a further aspect of this embodiment, the aft passenger door 135b (and the second jetway 160b) can be positioned beneath the forward wing 110. In another embodiment, the passengers can embark and disembark via other load/unload equipment, such as stairways. In any of these embodiments, the forward wing 110 (by being mounted to the projection 140) can be located a sufficient distance above the aft passenger door 135b to allow the second jetway 160b (and/or other equipment) to be positioned next to the aft passenger door 135b without interfering with the forward wing 110. Accordingly, passengers can enter and exit the aircraft 100 through multiple doors even though the wing/body junctions for the forward wing 110, the aft wing 120 and the strake 121 occupy a substantial fraction of the overall aircraft length.

The aircraft 100 can further include one or more galley doors 136 (shown in FIG. 2B as a forward galley door 136a, an intermediate galley door 136b, and an aft galley door 136c). Each of the galley doors 136 can be simultaneously serviced by corresponding galley service vehicles 161. Because the forward wing 110 is mounted to the projection 140, the galley service vehicles 161 can access the intermediate galley door 136b even though this galley door is positioned directly beneath the forward wing 110.

The aircraft 100 can be serviced by other ground support equipment simultaneously with loading and unloading passengers and servicing the aircraft galleys. For example, the cargo deck 134 of the aircraft 100 can be serviced by a container ramp 164 and/or a baggage ramp 162, generally in accordance with existing operational procedures, and without interfering with the jetways 160 or the galley service vehicles 161. In other embodiments, the cargo deck 134 can be serviced in accordance with other arrangements.

Figure 2C:
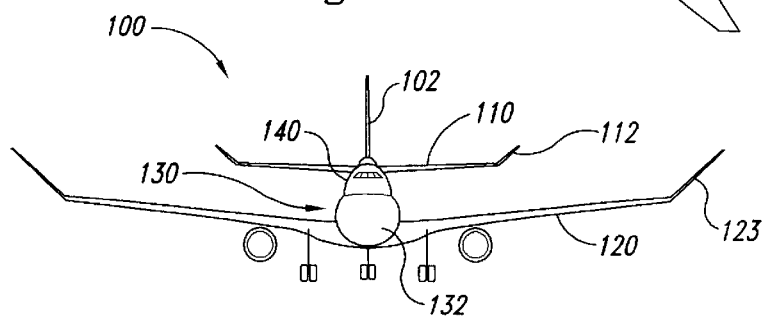

FIG. 2C is a front elevational view of an embodiment of the aircraft 100 described above with reference to FIGS. 2A–2B. In one aspect of this embodiment, the forward wing 110 can include upwardly canted forward wing tips 112 and the aft wing 120 can include upwardly canted aft wing tips 123. Canting the forward wing tips 112 upwardly can further reduce the likelihood for interference between the forward wing 110 and ground-based equipment, such as the jetways 160 discussed above with reference to FIG. 2B. Canting the aft wing tips 123 upwardly can reduce the likelihood for interference between the aircraft 100 and neighboring aircraft parked adjacent to the aircraft 100. For example, in one embodiment, the aircraft 100 can be positioned close enough to neighboring aircraft that the aft wing tips 123 extend over the wings of the neighboring aircraft in a "composite" parking arrangement.

Figure 3A:
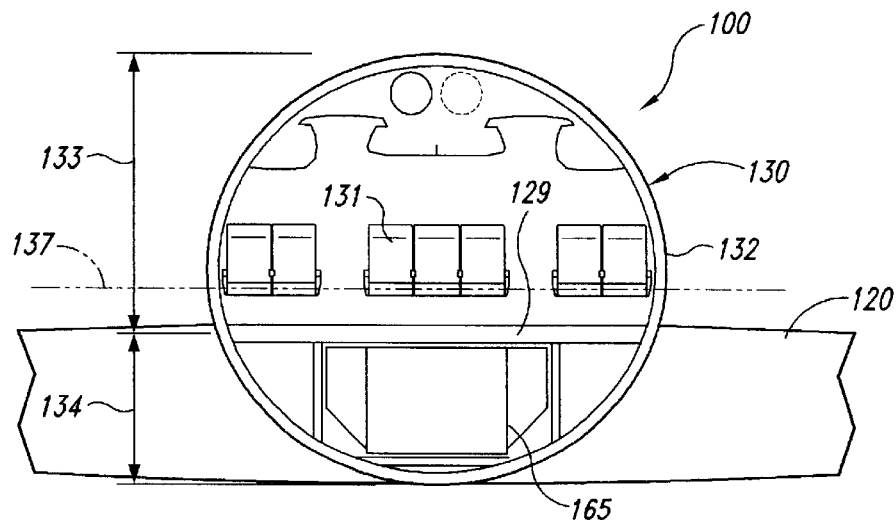
FIGS. 3A and 3B illustrate cross-sectional views of an aircraft generally similar to that shown in FIGS. 2A–2C in accordance with an embodiment of the invention.

FIG. 3A is a cross-sectional view of an aircraft 100 in accordance with an embodiment of the invention, taken substantially along line 3A—3A of FIG. 2A. In one aspect of this embodiment, the lower portion 132 of fuselage 130 can have an at least slightly elliptical shape with a transverse major axis. Further details of fuselages having such shapes are included in pending U.S. patent application Ser. No. 09/969,801, filed Oct. 2, 2001 and incorporated herein in its entirety by reference. The lower portion 132 can include a floor 129 that separates the lower deck 133 from the cargo deck 134. In one embodiment, seats 131 positioned in the lower deck 133 can define a lower seat plane 137 that is positioned generally above the aft wing 120. In another embodiment, the lower seat plane 137 can be positioned at or below the aft wing 120. In any of these embodiments, the lower seat plane 137 is positioned below the forward wing 110 (FIG. 2C), as described in greater detail below with reference to FIG. 3B.

Figure 3B:
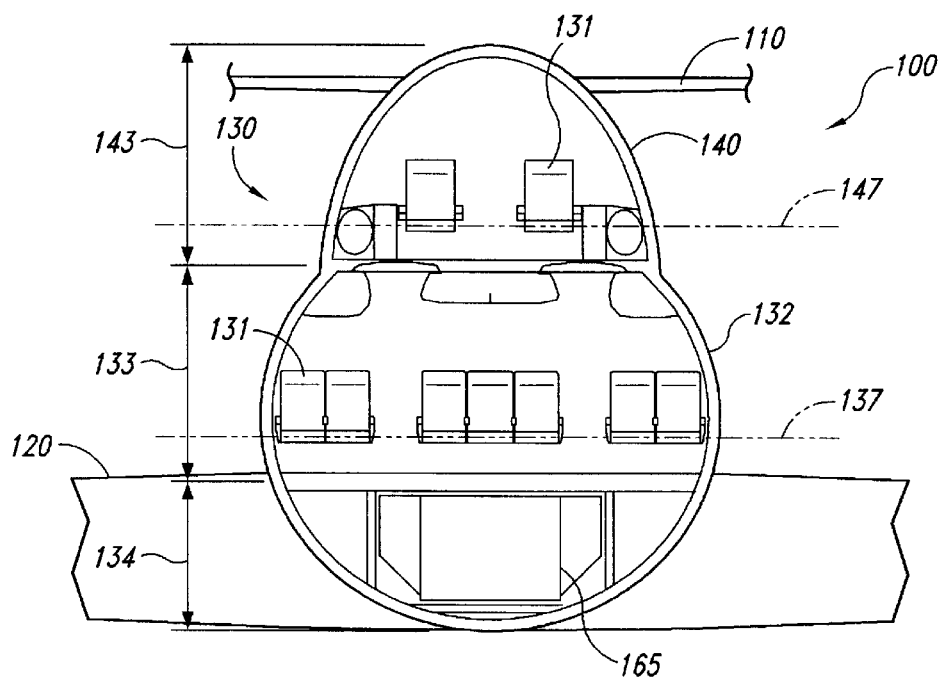

FIG. 3B is a cross-sectional view of an aircraft 100 in accordance with an embodiment of the invention, taken substantially along line 3B—3B of FIG. 2A. In one aspect of this embodiment, the fuselage projection 140 can extend above the lower portion 132 and can have a generally elliptical shape with a transverse minor axis and a vertical major axis. The seats 131 in the upper deck 143 can be arranged to define an upper seat plane 147 that is positioned above the aft wing 120 and below the forward wing 110. The lower seat plane 137 is accordingly positioned beneath the upper seat plane 147 and beneath the forward wing 110.

FIG. 4A is a partially exploded, cross-sectional plan view of the lower portion 132 of the fuselage 130, and the fuselage projection 140 superimposed on an outline of the lower portion 132. As shown in FIG. 4A, the fuselage projection 140 can include seats 131 arranged for first class passengers, and the lower deck 133 can include seats 131 arranged for business class and economy class passengers. In one aspect of this embodiment, the fuselage 130 can have a length of about 80 meters and can be configured to carry about 300 passengers. In another embodiment (shown in FIG. 4B), the lower portion 132 of the fuselage 130 can include a lower deck 133a having a cargo area 128 configured to carry cargo containers 165, and can further include a passenger area 129 having seats 131 for business class and economy class passengers. In one aspect of this embodiment, the lower deck 133a can include a cargo door 427 positioned just aft of the aft wing 120 (FIG. 2B) and just forward of the aft galley door 136c. In another embodiment, the aft galley door 136c can be supplemented or replaced by an aft galley door 436d positioned on the opposite side of the aircraft 100. In yet another aspect of this embodiment, the lower deck 133a can have a "combi" configuration in which seats can be removably placed in the cargo area 128 for selected flights. Accordingly, a single aircraft 100 can be easily reconfigured depending on whether a particular flight benefits more from additional passenger seats or additional cargo space. In other embodiments, the aircraft 100 can have other lengths and/or other seating and/or cargo carrying arrangements.

Figure 5:
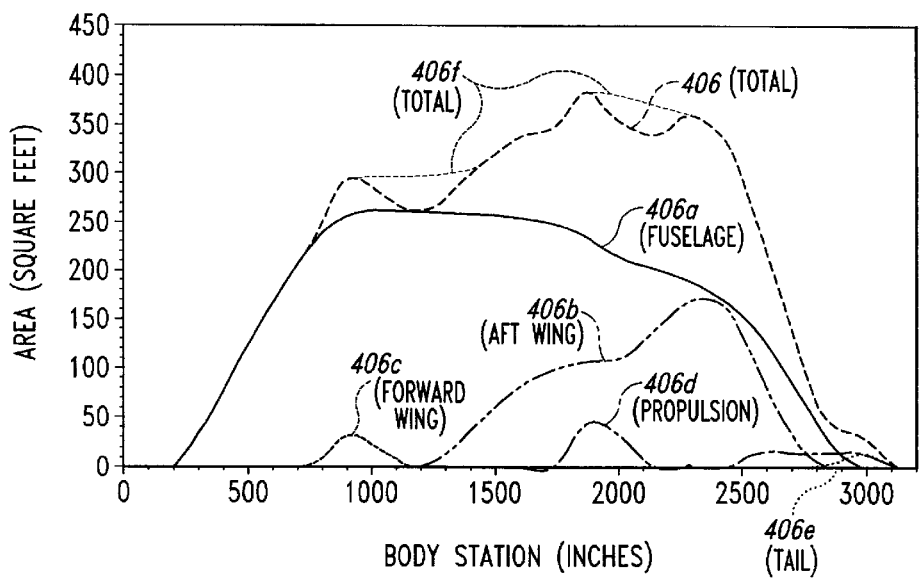
FIG. 5 illustrates cross-sectional area distributions for aircraft in accordance with embodiments of the invention.

FIG. 5 is a graph of the cross-sectional area as a function of body station for aircraft 100 in accordance with embodiments of the invention. The total cross-sectional area of the aircraft 100 (line 406) includes contributions from the fuselage (line 406a), the aft wing (line 406b), the forward wing (line 406c), the propulsion system (line 406d), and the vertical tail (line 406e). The total area cross-sectional area (line 406) can be generally monotonically increasing from the forward tip of the aircraft 100 to a maximum cross-sectional area (located in an intermediate portion of the aircraft 100, and at about station 1875 in one embodiment) and then generally monotonically decreasing to the aft tip of the aircraft 100. In one aspect of this embodiment, the cross-sectional area distribution can include a dip aligned with the trailing edge of the forward wing (located at about station 1175 in one embodiment) and a dip aligned with the trailing edge of the wing-mounted engines (located at about station 2150 in one embodiment). In another embodiment, these dips can be reduced or eliminated (as indicated by line 406f) by altering the integration of these components. For example, the area of the strake 121 (FIG. 2B) can increase more rapidly to account for the reduction in cross-sectional area at the trailing edge of the forward wing 110. In another embodiment, the nacelles 152 (FIG. 2B) can be integrated with the aft wing 120, for example, in a manner described in greater detail below with reference to FIGS. 7A–C. In still further embodiments, the aircraft 100 can have other component arrangements for achieving these and other area distributions.

One feature of embodiments of the aircraft 100 described above with reference to FIGS. 2A–5 is that the fuselage 130 can have a lower portion 132 from which the aft wing 120 extends, and a fuselage projection 140 from which the forward wing 110 extends. Accordingly, the forward wing 110 can be positioned above and forward of the aft wing 120.

Another advantage of this feature is that the access to the aircraft 100 can be increased. For example, at least one of the passenger doors 135 can be positioned beneath the forward wing 110, which can allow passengers to enter and exit the aircraft through more than one jetway. At least one of the galley doors 136 can also be positioned beneath the forward wing 110, which can increase the access to the aircraft 100 by service crew. As a result of both features, the amount of time required to turn the aircraft 100 around between flights can be reduced. One advantage of this feature is that the aerodynamic impact of the forward wing 110 on the aft wing 120 can be reduced when compared to existing canard/wing arrangements. For example, the increased vertical separation between the forward wing 110 and the aft wing 120 can reduce or eliminate the likelihood for trailing edge wakes and/or tip vortices generated by the forward wing 110 from impinging on or significantly impacting the performance of the aft wing 120. Accordingly, the stability, controllability and overall performance of the aft wing 120 can be improved.

Another feature of embodiments of the aircraft 100 is that components (such as the fuselage lower portion 132, the fuselage projection 140, the forward wing 110, the aft wing 120, and the nacelles 152) can be integrated in a manner that produces a generally monotonically increasing and monotonically decreasing cross-sectional area distribution. For example, in one embodiment, the wing-mounted nacelles 152 can be axially aligned with the aft region 149 of the fuselage projection 140, which has a decreasing cross-sectional area. The strake 121 can be aligned with the aft region 149 and/or with the trailing edge of the forward wing 110. An advantage of this feature is that the aircraft 100 will be less likely to generate shock waves as the speed of the aircraft approaches the speed of sound. Accordingly, in one embodiment, the aircraft 100 can fly at subsonic cruise speeds in excess of Mach 0.90. For example, in one particular embodiment, the aircraft 100 can fly at a subsonic cruise speed of from about Mach 0.95 to about Mach 0.98. In other embodiments, the aircraft 100 can have other subsonic cruise Mach numbers, and in still further embodiments, the aircraft 100 can be configured for supersonic cruise Mach numbers. For example, an aircraft 100 having an overall layout generally similar to any of those described above with reference to FIGS. 2A–5 can cruise at supersonic Mach numbers of from about 1.2 to about 1.6.

Still another feature of embodiments of the aircraft 100 described above with reference to FIGS. 2A–5 is that the fuselage projection 140 can house an upper passenger deck 143 and/or a flight deck 142. The upper passenger deck 143 can increase the payload of the aircraft 100 without increasing its length, and can accordingly allow airlines to carry more passengers and/or cargo without significantly restricting the number of gates available to the aircraft 100. By positioning the flight deck 142 in the fuselage projection 140, the pilots' forward visibility can be improved. This may be particularly beneficial for aircraft having supersonic or high subsonic cruise speeds because such aircraft may have longer and sharper nose sections than existing subsonic transport aircraft.

Figure 6:
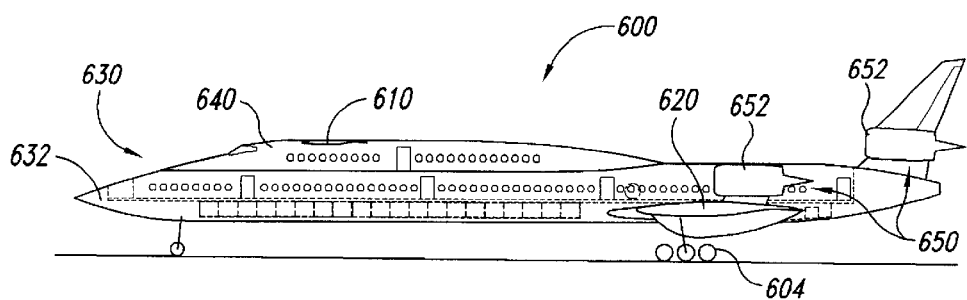
FIG. 6 is a side elevation view of an aircraft having a forward wing, an aft wing, and nacelles mounted above the aft wing in accordance with an embodiment of the invention.

In other embodiments, the aircraft can have other arrangements that include some or all of the foregoing features. For example, as shown in FIG. 6, an aircraft 600 can include a fuselage 630 having a lower portion 632 that supports an aft wing 620, and a fuselage projection 640 that supports a forward wing 610. The aircraft 600 can further include a propulsion system 650 having a tail-mounted nacelle 652 and two wing-mounted nacelles 652 that project above the upper surface of the aft wing 620. With this arrangement, the aft wing 620 can mitigate at least some of the noise generated by the exhaust plume emanating from the wing-mounted nacelles 652, which can allow for the installation of lower bypass ratio engines. The aft wing 620 can also shield the wing-mounted nacelles 652 from damage caused by foreign objects, such as debris kicked up from the runway by the main landing gear 604.

Figure 7A:
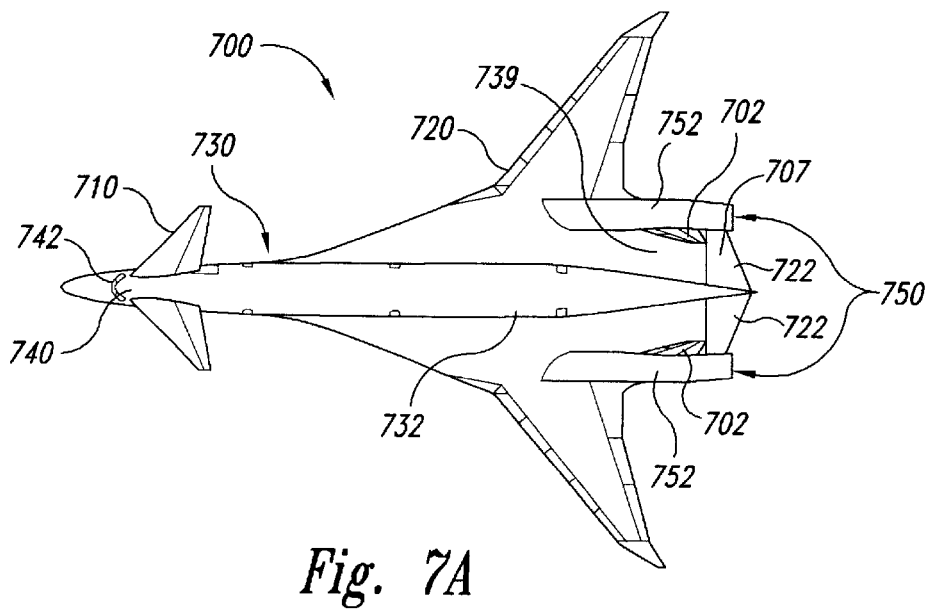
FIGS. 7A–7C illustrate an aircraft having an aft wing and an upwardly extending projection supporting a forward wing in accordance with another embodiment of the invention.
Figure 7B:
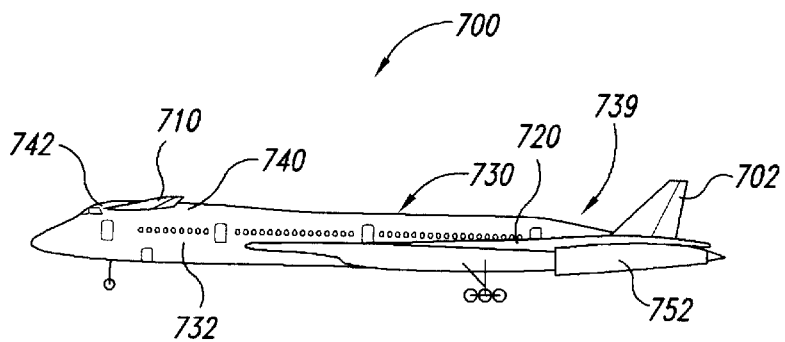
Figure 7C:
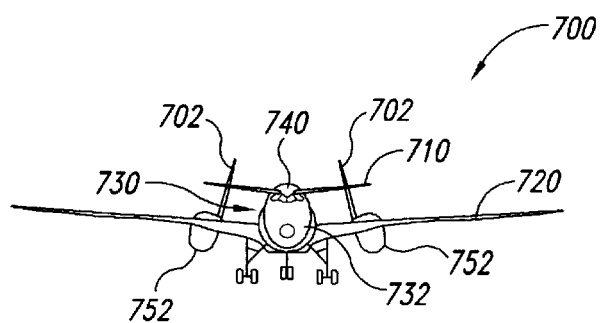

FIGS. 7A–7C illustrate an aircraft 700 in accordance with another embodiment of the invention. In one aspect of this embodiment, the aircraft 700 can include a fuselage 730 having a lower portion 732 and a fuselage projection 740 positioned above the lower portion 732. The lower portion 732 can support an aft wing 720, and the fuselage projection 740 can support a forward wing 710. The forward wing 710 can have a size relative to the aft wing 720 that is smaller than, larger than, or about the same as the relative size of the forward wing 110 described above with reference to FIG. 2A. The fuselage 730 can have a narrowed, vertically elongated, elliptical shape proximate to the forward wing 710, resulting in a generally smooth, monotonically increasing area distribution despite the presence of the fuselage projection 740 and the forward wing 710. The fuselage 730 can have a rounder, wider shape aft of the forward wing 710.

In a further aspect of this embodiment, the fuselage projection 740 can house a flight deck 742, but does not include additional passenger seating beyond that provided by the lower portion 732. By mounting the forward wing 710 to the fuselage projection 740 and above the aft wing 720, the aerodynamic impact of the forward wing 710 on the aft wing 720 can be reduced and/or eliminated, and access to the aircraft 700 during loading/unloading can be improved, in a manner generally similar to that described above.

The aircraft 700 can include an aft body 707 having elevons 722 for pitch control and trim, canted tails 702 provide for directional stability and control. The aircraft 700 can further include a propulsion system 750 having two engine nacelles 752 mounted to and integrated with the aft wing 720 and the aft body 707. In one aspect of this embodiment, the nacelles 752 can be longitudinally aligned with a tapering aft region 739 of the fuselage 730 to provide a generally monotonically increasing and decreasing cross-sectional area distribution for the aircraft overall. Further details of integrated nacelles are included in pending U.S. patent application Ser. No. 09/815,390 filed Mar. 22, 2001 and incorporated herein in its entirety by reference. In other embodiments, the components of the aircraft 700 can have other arrangements that support the forward wing 710 in a position substantially above the aft wing 720.

One feature of an embodiment of the aircraft 700 shown in FIGS. 7A–C is that the forward wing 710 can be positioned above the aft wing 720 without extending the fuselage projection 740 over a substantial length of the aircraft 700. Accordingly, this configuration can be suitable for aircraft having capacities that do not require the additional length of the fuselage projection shown in FIGS. 2A–2C. Another feature of an embodiment of the aircraft 700 described above with reference to FIGS. 7A–7C is that the propulsion system 750 can include two nacelles 752 integrated with the aft wing 720 and/or the aft body 707. An advantage of this feature is that the integrated nacelles 752 can produce a smooth overall cross-sectional area distribution, and the twin engine configuration can reduce initial engine cost when compared to configurations that include more than two engines. Conversely, an advantage of the three-engine, podded arrangement described above with reference to FIGS. 2A–C is that the overall thrust of the aircraft can be reduced because two-thirds of the overall thrust remain available in an engine out condition. The podded arrangement can also allow easy access to the engines.

From the foregoing, it will be appreciated that specific embodiments of the invention have been described herein for purposes of illustration, but that various modifications may be made without deviating from the spirit and scope of the invention. For example, aspects of the invention described separately in the context of different embodiments of the invention can be combined in other embodiments. Accordingly, the invention is not limited except as by the appended claims.

We claim:

1. An aircraft, comprising:
    a fuselage having a first portion and a second portion projecting upwardly from the first portion, the first portion housing a passenger deck, the second portion being positioned above the passenger deck and having a cross-sectional area that decreases in an aft direction;
    a first wing extending outwardly from the first portion of the fuselage; and
    a second wing extending outwardly from the second portion of the fuselage, the second wing being positioned above and forward of the first wing.

2. The aircraft of claim 1 wherein the passenger deck is a first passenger deck and wherein the second portion of the fuselage houses a second passenger deck positioned above the first passenger deck, further wherein the first wing is positioned at or below the first passenger deck and the second wing is positioned at or above the second passenger deck.

3. The aircraft of claim 1 wherein the fuselage includes:
    at least two passenger doors with at least one of the passenger doors being positioned beneath the second wing, and with both passenger doors being simultaneously accessible to ground-based passenger load/unload equipment; and
    at least one baggage door positioned beneath the at least two passenger doors, the at least one baggage door being accessible to ground-based baggage handling equipment simultaneously with the at least two passenger doors being accessible to the passenger load/unload equipment.

4. The aircraft of claim 1 wherein the first portion of the fuselage has a first length and the second portion of the fuselage has a second length, the second length being less than the first length.

5. The aircraft of claim 1, further comprising at least two galley doors accessible to ground-based galley service equipment, at least one of the galley doors being positioned beneath the level of the second wing.

6. The aircraft of claim 1, further comprising at least two galley doors accessible to ground-based galley service equipment, at least one of the galley doors being positioned directly beneath the second wing.

7. The aircraft of claim 1 wherein the fuselage has only a single passenger deck with passenger seats positioned in a seat plane, and wherein the first wing is attached to the fuselage at a first position located at or beneath the seat plane, further wherein the second wing is attached to the fuselage at a second position located above the seat plane.

8. The aircraft of claim 1 wherein the first wing includes an inboard region and an outboard region, and wherein the outboard region is canted upwardly relative to the inboard region.

9. The aircraft of claim 1 wherein the second wing includes an inboard region and an outboard region, and wherein the outboard region is canted upwardly relative to the inboard region.

10. The aircraft of claim 1, further comprising:
    a vertical stabilizer projecting upwardly from the fuselage; and
    a propulsion system having first and second turbine engines depending from the first wing, and a third turbine engine depending from the vertical stabilizer.

11. The aircraft of claim 1, further comprising a propulsion system having first and second turbine engines suspended from the first wing.

12. The aircraft of claim 1, further comprising a propulsion system having first and second turbine engines projecting upwardly from the first wing.

13. The aircraft of claim 1 wherein the fuselage includes a plurality of passenger doors simultaneously accessible to ground-based passenger load/unload equipment, and wherein at least one of the passenger doors is positioned beneath the level of the second wing.

14. The aircraft of claim 1 wherein the fuselage includes a plurality of passenger doors simultaneously accessible to ground-based passenger load/unload equipment, and wherein at least one of the passenger doors is positioned directly beneath the second wing.

15. The aircraft of claim 1 wherein the second portion of the fuselage tapers in an aft direction to blend with the first portion of the fuselage.

16. The aircraft of claim 1, further comprising a flight deck housed in the second portion of the fuselage.

17. The aircraft of claim 1 wherein the second wing includes:
    a wing box structure rigidly attached to the fuselage; and
    a movable aerodynamic surface movably coupled to the wing box structure to move between a first position and a second position, the moveable aerodynamic surface being configured to produce a first lift value when in the first position, the moveable aerodynamic surface being configured to produce a second lift value when in the second position.

18. The aircraft of claim 1 wherein the fuselage has an overall length of about 80 meters or less, and wherein the fuselage is configured to seat about 300 passengers or more.

19. The aircraft of claim 1 wherein the fuselage has a non-circular cross-sectional shape.

20. The aircraft of claim 1 wherein the first portion of the fuselage has a non-circular cross-sectional shape.

21. The aircraft of claim 1 wherein both the first and second portions of the fuselage each have non-circular cross-sectional shapes.

22. The aircraft of claim 1, further comprising a strake connected to and extending forward of the first wing.

23. The aircraft of claim 1, further comprising a propulsion system coupled to at least one of the first wing and the fuselage, and wherein the fuselage and the propulsion system are configured to operate at a sustained subsonic cruise Mach number of about 0.95 or higher.

24. The aircraft of claim 1 wherein the first wing has a first center of lift positioned aft of a center of gravity of the aircraft, and wherein the second wing has a second center of lift positioned forward of the center of gravity.

25. The aircraft of claim 1 wherein the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

26. The aircraft of claim 1 wherein the first wing has a first surface area, the second wing has a second surface area, and wherein a ratio of the second surface area to the first surface area has a value of from about 0.10 to about 0.50.

27. The aircraft of claim 1 wherein the fuselage has a first width proximate to the first wing and a second width proximate to the second wing, the first width being larger than the second width.

28. The aircraft of claim 1 wherein at least a portion of the passenger deck is convertible from a passenger seat configuration to a cargo configuration.

29. An aircraft, comprising:
a fuselage having at least one passenger deck, a first passenger door, and a second passenger door, with the first and second passenger doors being positioned to be simultaneously accessible to passenger load/unload equipment during passenger loading and unloading;
a swept first wing extending outwardly from the fuselage; and
a swept second wing extending outwardly from the fuselage, the second wing being positioned above and forward of the first wing, the second wing being positioned directly over at least a portion of the second passenger door while allowing access by the passenger load/unload equipment to the second passenger door.

30. The aircraft of claim 29 wherein the fuselage has a first portion and a second portion projecting upwardly from the first portion, the first portion housing the at least one passenger deck and the first and second passenger doors, and wherein the first wing extends outwardly from the first portion of the fuselage and the second wing extends outwardly from the second portion of the fuselage.

31. The aircraft of claim 29 wherein the at least one passenger deck is a first passenger deck, and wherein the fuselage has a first portion and a second portion projecting upwardly from the first portion, the first portion housing the first passenger deck and the first and second passenger doors, further wherein the second portion of the fuselage houses a second passenger deck, still further wherein the first wing extends outwardly from the first portion of the fuselage and the second wing extends outwardly from the second portion of the fuselage.

32. The aircraft of claim 29 wherein the fuselage includes at least two galley service doors simultaneously accessible to ground-based galley service equipment, and wherein at least one of the galley service doors is positioned beneath the level of the second wing.

33. The aircraft of claim 29 wherein the fuselage includes at least three galley service doors simultaneously accessible to ground-based galley service equipment.

34. The aircraft of claim 29 wherein the fuselage has only a single passenger deck with passenger seats positioned in a seat plane, and wherein the first wing is attached to the fuselage at a first position located at or beneath the seat plane, further wherein the second wing is attached to the fuselage at a second position located above the seat plane.

35. The aircraft of claim 29 wherein the first wing includes an inboard region and an outboard region, and wherein the outboard region is canted upwardly relative to the inboard region.

36. The aircraft of claim 29 wherein the second wing includes an inboard region and an outboard region, and wherein the outboard region is canted upwardly relative to the inboard region.

37. The aircraft of claim 29 wherein the fuselage has a first portion and a second portion projecting upwardly from the first portion, the first portion housing the at least one passenger deck and the first and second passenger loading doors, and wherein the first wing extends outwardly from the first portion of the fuselage and the second wing extends outwardly from the second portion of the fuselage, further wherein the second portion tapers in an aft direction to blend with the first portion.

38. The aircraft of claim 29 wherein the fuselage has an overall length of about 80 meters or less, and wherein the fuselage is configured to seat at least 300 passengers.

39. The aircraft of claim 29 wherein the fuselage has a non-circular cross-sectional shape.

40. The aircraft of claim 29, further comprising a propulsion system coupled to at least one of the first wing and the fuselage, and wherein the fuselage and the propulsion system are configured to operate at a sustained subsonic cruise Mach number of about 0.95 or higher.

41. The aircraft of claim 29 wherein the first wing has a first center of lift aft of a center of gravity of the aircraft, and wherein the second wing has a second center of lift forward of the center of gravity.

42. The aircraft of claim 29 wherein the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

43. The aircraft of claim 29 wherein the first wing has a first surface area, the second wing has a second surface area, and wherein a ratio of the second surface area to the first surface area has a value of from about 0.10 to about 0.50.

44. An aircraft, comprising:
a fuselage having a first portion and a second portion projecting upwardly from the first portion, the first portion housing a passenger deck, the second portion being positioned above the passenger deck and having a forward region with an increasing cross-sectional area and an aft region with a decreasing cross-sectional area;
a first wing extending outwardly from the fuselage;
a second wing extending outwardly from the fuselage, the second wing being positioned above and forward of the first wing; and
a propulsion system coupled to at least one of the first wing and the fuselage, at least a portion of the propulsion system being longitudinally aligned with the aft region of the second portion of the fuselage.

45. The aircraft of claim 44 wherein the passenger deck is a first passenger deck, and wherein the fuselage further includes a second passenger deck positioned above the first passenger deck and housed in the second portion, further wherein the second portion tapers in an aft direction to blend with the first portion.

46. The aircraft of claim 44, further comprising a vertical stabilizer projecting upwardly from the fuselage and wherein the propulsion system includes first and second turbine engines depending from the first wing, and a third turbine engine depending from the vertical stabilizer.

47. The aircraft of claim 44 wherein the propulsion system includes first and second turbine engines suspended from the first wing.

48. The aircraft of claim 44 wherein the propulsion system includes first and second turbine engines projecting upwardly from the first wing.

49. The aircraft of claim 44 wherein the fuselage has only a single passenger deck with passenger seats positioned in a seat plane, and wherein the first wing is attached to the fuselage at a first position located at or beneath the seat plane, further wherein the second wing is attached to the fuselage at a second position located above the seat plane.

50. The aircraft of claim 44 wherein the first wing extends outwardly from the first portion of the fuselage and the second wing extends outwardly from the second portion of the fuselage.

51. The aircraft of claim 44, further comprising:
a vertical stabilizer projecting upwardly from the fuselage; and
a propulsion system having first and second turbine engines depending from the first wing, and a third turbine engine depending from the vertical stabilizer.

52. The aircraft of claim 44 wherein the fuselage includes a plurality of passenger doors simultaneously accessible to ground-based passenger load/unload equipment, and wherein at least one of the passenger doors is positioned beneath the second wing.

53. The aircraft of claim 44 wherein the first portion has a first length and the second portion has a second length, the second length being less than the first length.

54. The aircraft of claim 44, further comprising a flight deck housed in the second portion of the fuselage.

55. The aircraft of claim 44 wherein the fuselage includes:
at least two passenger doors with at least one of the passenger doors being positioned beneath the second wing, and with both passenger doors being simultaneously accessible to ground-based passenger load/unload equipment;
at least one baggage door positioned beneath the at least two passenger doors, the at least one baggage door being accessible to ground-based baggage handling equipment simultaneously with the at least two passenger doors being accessible to the passenger load/unload equipment; and
at least two galley doors accessible to ground-based galley service equipment simultaneously with the at least two passenger doors being accessible to the passenger load/unload equipment, at least one of the galley doors being positioned beneath the level of the second wing.

56. The aircraft of claim 44 wherein the fuselage has an overall length of about 80 meters or less, and wherein the fuselage is configured to seat at least 300 passengers.

57. The aircraft of claim 44 wherein the fuselage has a non-circular cross-sectional shape.

58. The aircraft of claim 44 wherein the aircraft further comprises a strake connected to and extending forward of the first wing.

59. The aircraft of claim 44 wherein the fuselage and the propulsion system are configured to operate at a sustained subsonic cruise Mach number of at least about 0.95.

60. The aircraft of claim 44 wherein the first wing has a first center of lift aft of a center of gravity of the aircraft, and wherein the second wing has a second center of lift forward of the center of gravity.

61. The aircraft of claim 44 wherein the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

62. The aircraft of claim 44 wherein the first wing has a first surface area, the second wing has a second surface area, and wherein a ratio of the second surface area to the first surface area has a value of from about 0.10 to about 0.50.

63. An aircraft, comprising:
a fuselage having a first portion and a second portion projecting upwardly from the first portion, the first portion housing a passenger deck, the second portion being positioned above the passenger deck and having a forward region with an increasing cross-sectional area and an aft region with a decreasing cross-sectional area;
a first wing extending outwardly from the fuselage;
a second wing extending outwardly from the fuselage, the second wing being positioned above and forward of the first wing; and
a strake extending outwardly from the fuselage forward of the first wing, at least a portion of the strake being axially aligned with the aft region of the second portion of the fuselage.

64. The aircraft of claim 63 wherein the fuselage includes first and second passenger doors positioned forward of the strake and positioned to be simultaneously accessible to ground-based passenger load/unload equipment, and wherein at least one of the passenger doors is positioned beneath the second wing.

65. The aircraft of claim 63, further comprising a propulsion system that includes a plurality of turbine engines, at least a portion of the propulsion system being axially aligned with the aft region of the second portion of the fuselage.

66. The aircraft of claim 63 wherein the first wing extends outwardly from the first portion of the fuselage and the second wing extends outwardly from the second portion of the fuselage.

67. The aircraft of claim 63, further comprising:
a vertical stabilizer projecting upwardly from the fuselage; and
a propulsion system having first and second turbine engines depending from the first wing, and a third turbine engine depending from the vertical stabilizer.

68. The aircraft of claim 63 wherein the fuselage includes a plurality of passenger load/unload doors simultaneously accessible to g round-based passenger load/unload equipment, and wherein at least one of the passenger load/unload doors is positioned beneath the second wing.

69. The aircraft of claim 63 wherein the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

70. The aircraft of claim 63 wherein the first wing has a first surface area, the second wing has a second surface area, and wherein a ratio of the second surface area to the first surface area has a value of from about 0.10 to about 0.50.

71. An aircraft, comprising:
a fuselage having a first portion with a first passenger deck and a second portion with a second passenger deck positioned above the first passenger deck, the first passenger deck having a plurality of passenger doors on a single side of the aircraft simultaneously accessible to ground-based passenger load/unload equipment, the second portion having an aft region that tapers to blend with the first portion of the fuselage;
a first wing extending outwardly from the fuselage at or below the first passenger deck;

a second wing extending outwardly from the fuselage at or above the second passenger deck, the second wing being positioned above the first wing and forward of the first wing, the second wing being positioned directly over at least a portion of at least one of the passenger doors while allowing access to the at least one passenger door;

a propulsion system coupled to at least one of the first wing and the fuselage, at least a portion of the propulsion system being axially aligned with the aft region of the second portion of the fuselage; and a strake extending outwardly from the fuselage forward of the first wing, at least a portion of the strake being axially aligned with the aft region of the second portion of the fuselage.

72. The aircraft of claim 71 wherein the first wing and the second wing each include an inboard region and an outboard region, and wherein the outboard region of each wing is canted upwardly relative to the inboard region.

73. The aircraft of claim 71, further comprising a vertical stabilizer projecting upwardly from the fuselage and wherein the propulsion system includes first and second turbine engines depending from the first wing, and a third turbine engine depending from the vertical stabilizer.

74. The aircraft of claim 71 wherein the fuselage includes:

at least one baggage door positioned beneath the passenger doors, the at least one baggage door being accessible to ground-based baggage handling equipment simultaneously with the at least two passenger doors being accessible to the passenger load/unload equipment; and at least three galley doors accessible to ground-based galley service equipment simultaneously with the passenger doors being accessible to the passenger load/unload equipment, at least one of the galley doors being positioned aft of the first wing and at least one of the galley doors being positioned forward of the first wing.

75. The aircraft of claim 71 wherein the fuselage and propulsion system are configured to operate at a sustained subsonic cruise Mach number of about 0.95 or higher.

76. The aircraft of claim 71 wherein the first wing has a first center of lift aft of a center of gravity of the aircraft, and wherein the second wing has a second center of lift forward of the center of gravity.

77. The aircraft of claim 71 wherein the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

78. A method for loading and unloading an aircraft, comprising:

positioning a first passenger load/unload device adjacent to a first passenger door of the aircraft, the aircraft having a first wing and a second wing positioned forward of and above the first wing, the first passenger door being positioned forward of the first wing;

positioning a second passenger load/unload device adjacent to a second passenger door of the aircraft while at least a portion of the second passenger load/unload device is positioned directly beneath the second wing of the aircraft and while the first passenger load/unload device is positioned adjacent to the first passenger door; and simultaneously moving passengers through both the first and second passenger doors.

79. The method of claim 78 wherein the first and second passenger doors are positioned forward of the first wing, and wherein positioning the first and second passenger load/unload devices includes positioning the first and second passenger load/unload devices forward of the first wing.

80. The method of claim 78 wherein the aircraft includes at least two galley access doors, and wherein the method further comprises:

positioning a first piece of galley service equipment adjacent to the first galley access door; and positioning a second piece of galley service equipment adjacent to the second galley access door, with at least one of the pieces of galley service equipment is positioned beneath the second wing.

81. A method for manufacturing an aircraft, comprising:

providing a fuselage having a first portion and a second portion projecting upwardly from the first portion, the first portion housing at least one passenger deck, the second portion being positioned above the at leaste one passenger deck and having a cross-sectional area that decreases in an aft direction;

mounting a first wing to the first portion of the fuselage; and mounting a second wing to the second portion of the fuselage, with the second wing being positioned above and forward of the first wing.

82. The method of claim 81 wherein the at least one passenger deck includes a first passenger deck, and wherein the method further comprises forming a second passenger deck in the second portion of the fuselage, with the second passenger deck positioned above the first passenger deck and with the first wing positioned at or below the first passenger deck and the second wing positioned at or above the second passenger deck.

83. The method of claim 81 wherein the fuselage has only a single passenger deck with passenger seats positioned in a seat plane, and wherein mounting the first wing includes attaching the first wing to the fuselage at a first position located beneath the seat plane, further wherein mounting the second wing includes attaching the second wing to the fuselage at a second position located above the seat plane.

84. The method of claim 81, further comprising providing the fuselage with a plurality of passenger doors that are simultaneously accessible to ground-based passenger load/unload equipment, with at least one of the passenger doors positioned beneath the second wing.

85. The method of claim 81, further comprising providing the fuselage with:

at least two passenger doors with at least one of the passenger doors being positioned beneath the second wing, and with both passenger doors being simultaneously accessible to ground-based passenger load/unload equipment;

at least one baggage door positioned beneath the at least two passenger doors, the at least one baggage door being accessible to ground-based baggage handling equipment simultaneously with the at least two passenger doors being accessible to the passenger load/unload equipment; and at least two galley doors accessible to ground-based galley service equipment simultaneously with the at least two passenger doors being accessible to the passenger load/unload equipment, at least one of the galley load/unload doors being beneath the second wing.

86. The method of claim 81 wherein the fuselage has a forward portion, an aft portion, and an intermediate portion between the forward and aft portions, and wherein the method further comprises mounting a propulsion system to at least one of the fuselage and the first wing, further wherein mounting the first wing, the second wing and the propulsion system includes providing an overall cross-sectional area distribution of the aircraft that increases at least approximately monotonically from the forward portion to the intermediate portion, and decreases at least approximately monotonically from the intermediate portion to the aft portion.

87. The method of claim 81, further comprising forming the first wing to have a first surface area and forming the second wing to have a second surface area, with a ratio of the second surface area to the first surface area having a value of from about 0.10 to about 0.50.

88. An aircraft, comprising:
a fuselage having a first portion and a second portion projecting upwardly from the first portion, the first portion housing a passenger deck, the second portion being positioned above the passenger deck;
a first wing extending outwardly from the first portion of the fuselage; and
a second wing extending outwardly from the second portion of the fuselage, the second wing being positioned above and forward of the first wing; wherein
the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

89. An aircraft, comprising:
a fuselage having at least one passenger deck, a first passenger door, and a second passenger door, with the first and second passenger doors being positioned to be simultaneously accessible to passenger load/unload equipment during passenger loading and unloading;
a swept first wing extending outwardly from the fuselage; and
a swept second wing extending outwardly from the fuselage, the second wing being positioned above and forward of the first wing, the second wing being positioned over the second passenger door while allowing access by the passenger load/unload equipment to the second passenger door; wherein
the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

90. An aircraft, comprising:
a fuselage having a first portion with a first passenger deck and a second portion with a second passenger deck positioned above the first passenger deck, the first passenger deck having a plurality of passenger doors on a single side of the aircraft simultaneously accessible to ground-based passenger load/unload equipment, the second portion having an aft region that tapers to blend with the first portion of the fuselage;
a first wing extending outwardly from the fuselage at or below the first passenger deck;
a second wing extending outwardly from the fuselage at or above the second passenger deck, the second wing being positioned above the first wing and forward of the first wing, the second wing being positioned over at least one of the passenger doors while allowing access to the at least one passenger door;
a propulsion system coupled to at least one of the first wing and the fuselage, at least a portion of the propulsion system being axially aligned with the aft region of the second portion of the fuselage; and
a strake extending outwardly from the fuselage forward of the first wing, at least a portion of the strake being axially aligned with the aft region of the second portion of the fuselage; wherein
the aircraft has a forward portion, an aft portion, and an intermediate portion between the forward and aft portions, and wherein a cross-sectional area distribution of the aircraft increases at least approximately monotonically from the forward portion to the intermediate portion, and wherein the cross-sectional area distribution decreases at least approximately monotonically from the intermediate portion to the aft portion.

91. A method for manufacturing an aircraft, comprising:
providing a fuselage having a first portion and a second portion projecting upwardly from the first portion, the first portion housing at least one passenger deck, the second portion being positioned above the at least one passenger deck, the fuselage further having a forward portion, an aft portion, and an intermediate portion between the forward and aft portions;
mounting a first wing to the first portion of the fuselage;
mounting a second wing to the second portion of the fuselage, with the second wing being positioned above and forward of the first wing; and
mounting a propulsion system to at least one of the fuselage and the first wing, wherein mounting the first wing, the second wing and the propulsion system includes providing an overall cross-sectional area distribution of the aircraft that increases at least approximately monotonically from the forward portion to the intermediate portion, and decreases at least approximately monotonically from the intermediate portion to the aft portion.

92. An aircraft, comprising:
a fuselage having a first portion and a second portion projecting upwardly from the first portion, the first portion housing a passenger deck having at least one door positioned to provide access to people entering and/or exiting the aircraft, the second portion being positioned above the passenger deck;
a first wing extending outwardly from the first portion of the fuselage; and
a second wing extending outwardly from the second portion of the fuselage, the second wing being positioned above and forward of the first wing, the second wing extending directly over at least a portion of the at least one door.

93. The aircraft of claim 92 wherein the at least one door includes a passenger door accessible to passengers entering and/or exiting the passenger deck.

94. The aircraft of claim 92 wherein the at least one door includes a galley door accessible to ground-based galley service equipment.

* * * * *

UNITED STATES PATENT AND TRADEMARK OFFICE
CERTIFICATE OF CORRECTION

PATENT NO. : 6,705,567 B2
DATED : March 16, 2004
INVENTOR(S) : Lawrence Y. Dong et al.

It is certified that error appears in the above-identified patent and that said Letters Patent is hereby corrected as shown below:

Title page,
Item [56], References Cited, U.S. PATENT DOCUMENTS, insert
-- 09/969,801 Sankrithi 10/2/01
  EP000547266A1 Regnat (English Abstract) 6/23/93
  WO 82/00048 The Boeing Company 1/7/82 --

Column 16,
Line 19, "leaste" should be -- least --;

Signed and Sealed this

Ninth Day of November, 2004

JON W. DUDAS
*Director of the United States Patent and Trademark Office*